(12) United States Patent
Zickermann

(10) Patent No.: US 7,994,667 B2
(45) Date of Patent: Aug. 9, 2011

(54) FAN COOLING OF AN ELECTRIC ENGINE

(75) Inventor: Richard Zickermann, Villnachern (CH)

(73) Assignee: Alstom Technology Ltd, Baden (CH)

( * ) Notice: Subject to any disclaimer, the term of this patent is extended or adjusted under 35 U.S.C. 154(b) by 347 days.

(21) Appl. No.: 12/394,302

(22) Filed: Feb. 27, 2009

(65) Prior Publication Data

US 2009/0212647 A1      Aug. 27, 2009

(30) Foreign Application Priority Data

Feb. 27, 2008   (EP) .................................. 08102068

(51) Int. Cl.
*H02K 1/32* (2006.01)
(52) U.S. Cl. ................. 310/61; 310/62; 310/63; 310/64
(58) Field of Classification Search ............... 310/58, 310/59, 60 A, 61–64, 86
See application file for complete search history.

(56) References Cited

U.S. PATENT DOCUMENTS

| | | | | |
|---|---|---|---|---|
| 3,906,265 A | * | 9/1975 | Giles ................................ | 310/55 |
| 4,286,183 A | * | 8/1981 | Montgomery ................... | 310/62 |
| 4,347,451 A | | 8/1982 | Mizuyama et al. | |
| 6,011,334 A | * | 1/2000 | Roland ............................. | 310/86 |
| 6,129,477 A | * | 10/2000 | Shoykhet ........................ | 403/267 |
| 6,847,140 B2 | * | 1/2005 | Kimberlin et al. ............... | 310/86 |
| 7,898,128 B2 | * | 3/2011 | Hattori et al. ................... | 310/61 |
| 2003/0034701 A1 | * | 2/2003 | Weeber et al. .................. | 310/52 |
| 2004/0150270 A1 | * | 8/2004 | Nagayama et al. ............. | 310/61 |

FOREIGN PATENT DOCUMENTS

| | | |
|---|---|---|
| DE | 3905997 | 8/1990 |
| DE | 19741200 | 1/1999 |
| GB | 372899 | 5/1932 |
| GB | 690538 | 4/1953 |
| WO | WO-9842064 | 9/1998 |

\* cited by examiner

*Primary Examiner* — Quyen Leung
*Assistant Examiner* — Naishadh N Desai
(74) *Attorney, Agent, or Firm* — Leydig, Voit & Mayer, Ltd.

(57) ABSTRACT

An air cooling arrangement for an electric engine comprises a rotor, a stator disposed co-axially on the rotor, and a partition disposed between the rotor and the stator and extending along a complete axial length of the rotor and mounted on the rotor so as to be in co-rotational communication with the rotor, the partition providing a segregated cooling air flow so as to prevent a radial flow of cooling air from the rotor to the stator. The arrangement further comprises at least one fan configured to provide cooling air to the rotor and the stator, wherein the partition partitions and segregates the at least one fan and provides an inner fan and an outer fan and extends between the inner fan and the outer fan.

7 Claims, 3 Drawing Sheets

FAN COOLING OF AN ELECTRIC ENGINE

Priority is claimed to European Patent Application No. EP 08102068.7, filed on Feb. 27, 2008, the entire disclosure of which is incorporated by reference herein.

The invention relates to an arrangement for a cooling of an electric engine, such as a hydro generator and more particularly to energy efficient cooling of such an engine.

BACKGROUND

Electric engines comprise rotors with high revolution speeds, enclosed by stators typically cooled by fans connected to or driven by the shaft of the rotor.

Part of the rotational energy of the rotor is expended accelerating air passed across the rotor. A certain amount of air needs to pass the rotor in order to keep it cool, however, any excess results in unnecessary energy expenditure, reducing the overall energy efficiency of the engine.

In an arrangement for an electric engine, fans are located at either end of the rotor blowing cooling air axially across the rotor from both ends. The convergence of the cooling air subsequently forces it radially through cooling slots in the stator. In another arrangement a single fan is used where cooling air is either blown or sucked across the rotor from where a component of the cooling air flows radially from the rotor through to the stator. In both these arrangements cooling air in excess of what is required to cool the rotor initially passes over the rotor resulting in lower engine energy efficiency.

DE 39 05 997 discloses another arrangement for cooling the coils of an induction motor. The arrangement includes a closed and smooth cylinder jacket attached to, in one induction motor arrangement, stator coil formers and, in another induction motor arrangement, rotor coil formers. In each alternative form the jacket provides the coil of the induction motor with a cooling channel in which a fan can exclusively provide cooling of the coils. U.S. Pat. No. 4,347,451 discloses a further cooling arrangement applied to a salient pole dynamoelectric machine. In the arrangement a barrier enables separate cooling of the stator and rotor by means of forced draft supplied from respective exclusive blowers.

SUMMARY OF THE INVENTION

The present invention provides a means of improving the efficiency of a fan cooled electric engine.

According to the present invention cooling airflow within the electric engine is partitioned so as to limit the quantity of air needed to pass over the rotor.

Another aspect of the invention provides a means of independently configuring cooling air rates to a rotor and stator. Accordingly, an aspect of the invention provides an air-cooling arrangement for an electric engine where the electric engine has a rotor, a stator mounted co-axially to the rotor and at least one fan for providing cooling air to the rotor and stator. A partition is mounted between the rotor and the stator and extends along the axial length of the rotor so as to segregate the cooling airflow. In this way the axial flow of cooling air from the rotor to the stator is prevented. This has the advantages that only the minimum air required to cool the rotor is accelerated by the rotor and thus engine efficiency is improved. Preferably the partition is mounted on the rotor so as to be in co-rotational communication with the rotor.

Segregation of the cooling paths further provides the advantage that cooling airflow rates can be individually configured to optimise cooling fan energy consumption. Accordingly in an aspect of the invention the fan is mounted at an end the rotor and has an inner fan for cooling the rotor and an outer fan for cooling the stator. According to another preferred aspect a second fan is mounted towards the other end of the rotor and is also a two-part fan with an inner fan for cooling the rotor and an outer fan for cooling the stator. In another aspect the inner part of the second fan is a support for the outer fan. In yet another aspect the outer fans blow cooling air towards the stator. According to a further aspect of the invention the cooling airflow path for the stator is blocked towards the second end of the rotor, preferably by the outer portion of the second fan.

According to yet another aspect of the invention the partition also segregates the inner fans or portions from the outer fans or portions. In this way cooling air leakage between the two cooling zones is reduced.

BRIEF DESCRIPTION OF THE DRAWINGS

By way of example, an embodiment of the invention is described more fully hereinafter with reference to the accompanying drawings, in which.

DETAILED DESCRIPTION

Figure 1:
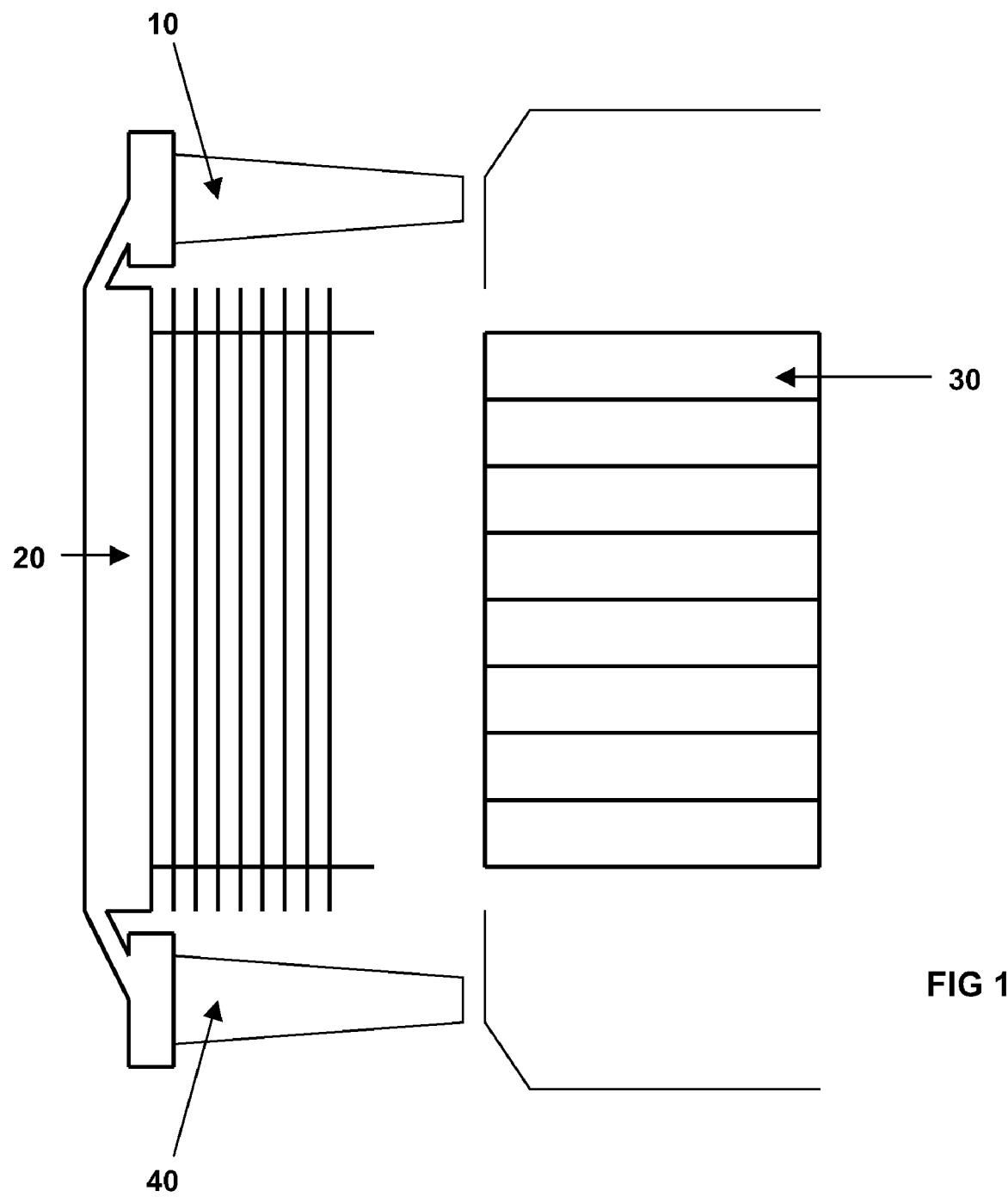
FIG. 1 is a cross sectional view of a prior art electric engine cooling arrangement.

Preferred embodiments of the present invention are now described with reference to the drawings, wherein like reference numerals are used to refer to like elements throughout. In the following description, for purposes of explanation, numerous specific details are set forth in order to provide a thorough understanding of the invention. It may be evident, however, that the invention may be practiced without these specific details. In other instances, well-known structures and devices are shown in block diagram form in order to facilitate description of the invention.

FIG. 1 shows a prior art cooling arrangement with fans 10,40 mounted to either side of a rotor 20 where the fans force cooling air into the machine. The cooling airflow is not segregated and so provides cooling for both the rotor 20 and the stator 30.

Figure 2:
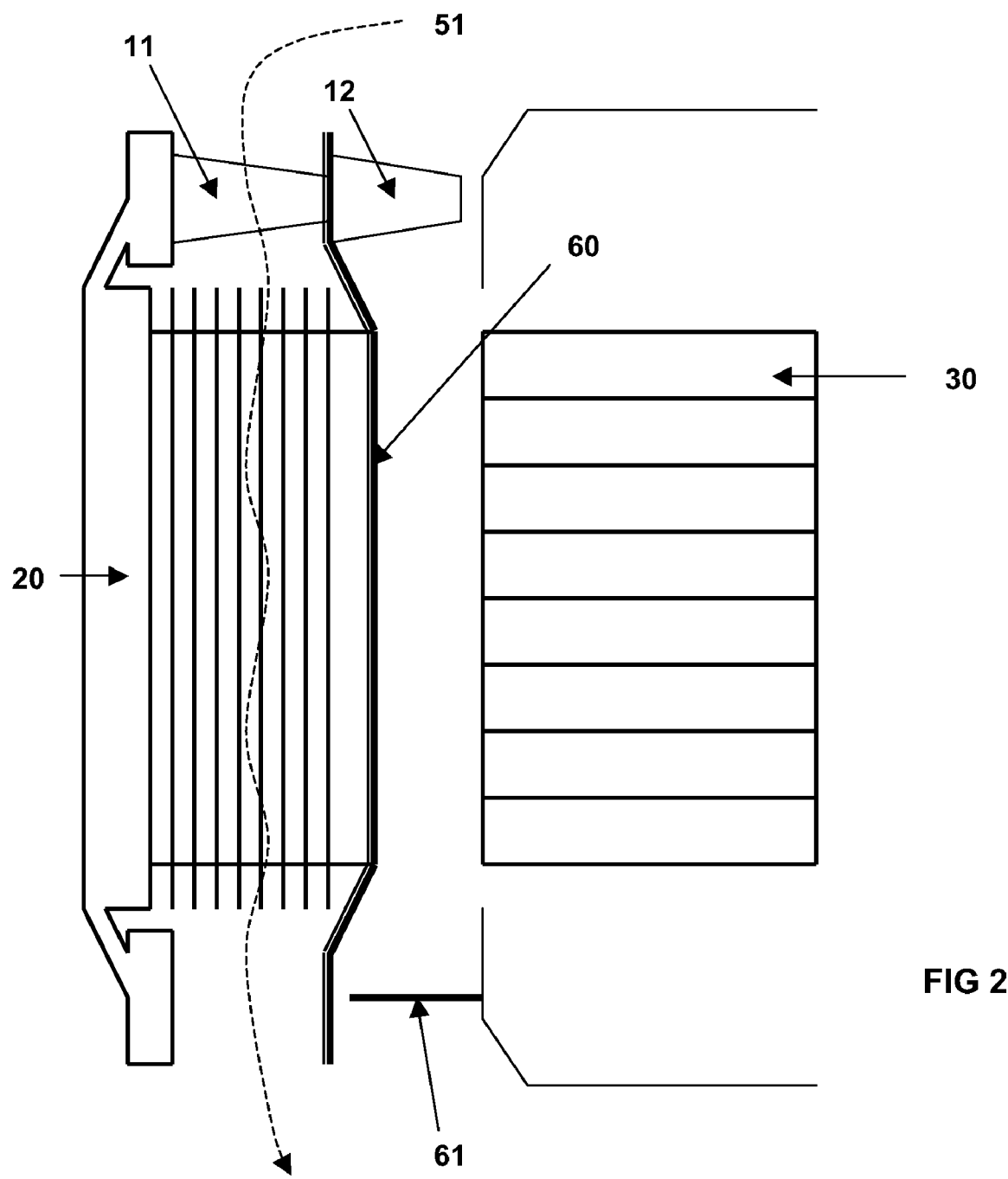
FIG. 2 is a cross sectional view of a preferred embodiment of the invention showing a partition and a two part fan.
Figure 3:
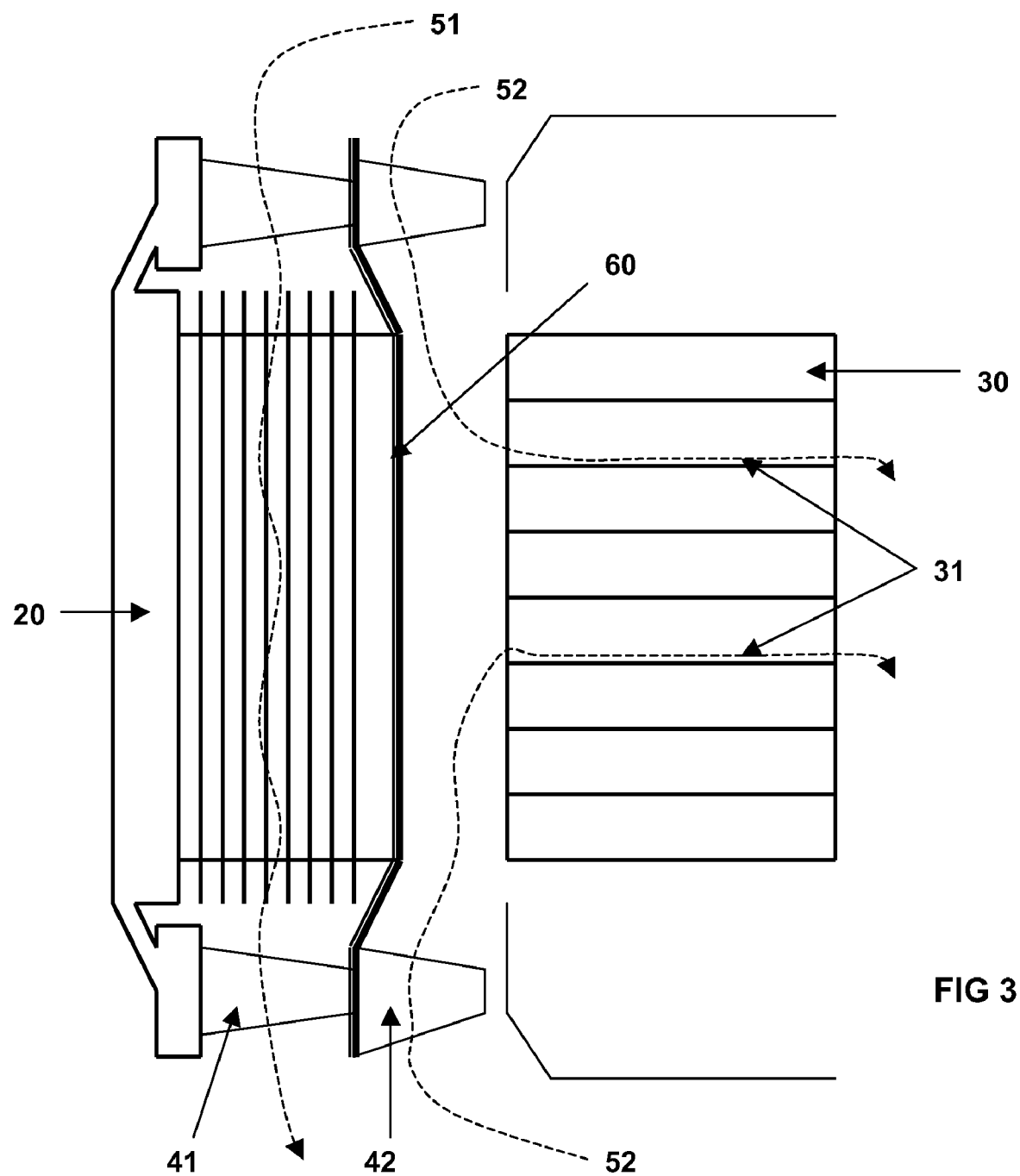
FIG. 3 is a cross sectional view of another preferred embodiment of the invention with partitioned fans at either end of the rotor directed cooling air inwards towards the stator.

As seen in FIG. 2, disclosed is an arrangement of the invention suitable for a hydro generator showing air-cooling the rotor 20 where cooling air is segregated by a partition 60 so that the rotor 20 and stator 30 are separately cooled. FIG. 3 shows another cooling air embodiment with a partition 60 having fans mounted at either end of the rotor 20.

In a preferred embodiment a fan is mounted at one end of the rotor 20. While the fan may be a one part fan 10, preferably the fan is a two-part fan with an inner radial section 11 and an outer radial section 12 directing cooling air to the rotor 20 and stator 30 respectively. The two-part nature of the fan 10 enables improved flow segregation as well as flow rate optimisation to the different airflow paths. A partition 60 is mounted co-axially between the axial planes of the rotor 20 and the stator 30 and preferable mounted onto the rotor 20 so that it rotates with the rotor 20. The purpose of the partition 60 is to segregate the cooling air from the fan 10 so that a portion of the cooling air produced from the inner portion 11 of the fan exclusively cools the rotor 20 and another portion of the cooling air generated from an outer portion 12 of the fan exclusively cools the stator 30. This is achieved by the partition 60 forming a barrier that prevents cooling airflow flowing radially from the rotor 20 to the stator 30. To further enhance the sealing of the two cooling paths the partition 60 preferably partitions the inner and outer fan portions. In this way, only air needed to cool the rotor 20 needs to be directed towards the rotor 20 limiting the energy loss.

The outer portion of the fan 12 directs cooling air axially between the gap formed between the partition 60 and the stator 30. The initial axial flow direction is changed to radial flow by the blocking of the air flow either by air directed in an opposing direction from a fan mounted on the opposite end of the rotor 20 as seen in FIG. 3 or by a physical barrier 61. The physical barrier 61 being a panel or plate mounted at a far end of the gap. Preferably the plate 61 is mounted on a stationary part of the electrical engine although alternatively it can be mounted on the partition 60.

In another preferred embodiment, as shown in FIG. 3, a secondary fan 40 is mounted on the opposed end of the rotor 20 from that of the first fan 10. Like the first fan 10 this fan 40 is preferably a two-part fan with inner 41 and outer 42 portions. Preferably the partition 60 segregates the portions 41,42 by extending between them and in this way enhancing sealing segregation. A further advantage of this segregation is that the fan portions 41, 42 of the secondary fan 40 can have opposing pitches. In this way cooling air can be drawn out from the rotor 20 by the inner portion 41 while air can be forced in the opposite direction into the partition/stator gap to aid the radial flow of cooling air through the stator cooling slots 31 by the outer portion 42. While the outer portion 42 maybe mounted directly onto the partition 60 without being supported it is preferable to install an inner support portion 41 where the inner portion comprises either supports or alternatively supporting fan blades. Fan blades are preferred as they offer less drag in the moving gas environment.

Although the invention has been herein shown and described in what is conceived to be the most practical and preferred embodiment, it is recognised that departures can be made within the scope of the invention, which is not to be limited to the details described herein but is to be accorded the full scope of the appended claims so as to embrace any and all equivalent devices and apparatus.

REFERENCE NUMBERS

Numbers used in the diagrams
10 Fan
11 Inner fan
12 Outer fan
20 Rotor
30 Stator
31 Stator cooling slots
40 Second fan
41 Inner portion forming a second fan or support for the outer section
42 Outer portion forming an outer fan or barrier
50 Cooling air
51 Cooling air through the rotor
52 Cooling air through the stator
60 Partition
61 Stator cooling air flow path barrier

What is claimed is:

1. An air cooling arrangement for an electric engine, the electric engine comprising:
   a rotor;
   a stator disposed co-axially to the rotor;
   a partition disposed between the rotor and the stator and extending along a complete axial length of the rotor and mounted on the rotor so as to be in co-rotational communication with the rotor, the partition providing a segregated cooling air flow so as to prevent a radial flow of cooling air from the rotor to the stator; and
   at least one fan configured to provide cooling air to the rotor and the stator, wherein the partition partitions and segregates the at least one fan into an inner fan and an outer fan by extending between the inner fan and the outer fan, wherein the inner fan is disposed between the partition and the rotor and configured to produce a cooling air to cool the rotor, and wherein the outer fan is disposed between the partition and the stator and configured to produce a cooling air to cool the stator.

2. The arrangement recited in claim 1, wherein the at least one fan includes a first fan disposed towards a first end of the rotor, the first fan including an inner first fan for cooling the rotor and an outer first fan for cooling the stator.

3. The arrangement recited in claim 2, wherein the at least one fan includes a second fan disposed towards a second end of the rotor, the second fan including an inner second fan for cooling the rotor and an outer second fan for cooling the stator.

4. The arrangement recited in claim 2, wherein the at least one fan includes a second fan disposed towards a second end of the rotor, the second fan including an outer second fan for cooling the stator and an inner second portion so as to support the second outer fan.

5. The arrangement recited in claim 4, wherein the outer first fan and the outer second fan are configured to blow a cooling air towards the stator.

6. The arrangement recited in claim 2, further comprising a physical barrier disposed towards a second end of the rotor, wherein the physical barrier blocks the cooling air cooling the stator.

7. The arrangement recited in claim 6, wherein a second fan is disposed at the second end of the rotor, the second fan having an outer portion blocking the cooling air cooling the stator.

* * * * *